T. SHARP.
CAR WHEEL.

No. 40,123.

PATENTED SEPT. 29, 1863.

UNITED STATES PATENT OFFICE.

THOMAS SHARP, OF CHICAGO, ILLINOIS.

IMPROVEMENT IN CAR-WHEELS.

Specification forming part of Letters Patent No. 40,123, dated September 29, 1863.

*To all whom it may concern:*

Be it known that I, THOMAS SHARP, of Chicago, in the county of Cook and State of Illinois, have invented a new and useful Improvement in Car-Wheels; and I do hereby declare that the following is a full, clear, and exact description thereof, reference being had to the accompanying drawings, and the letters and figures marked thereon, which form part of this specification.

Figure 1:
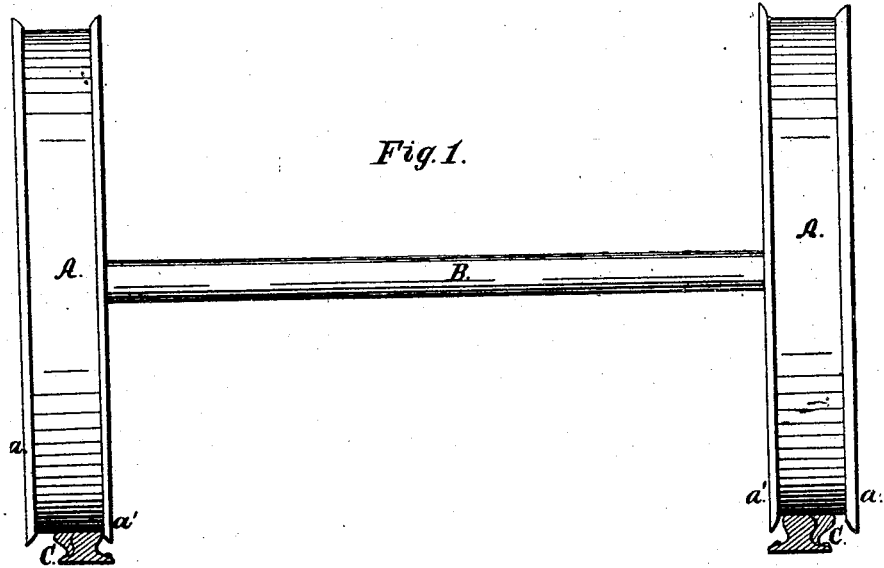
Figure 2:
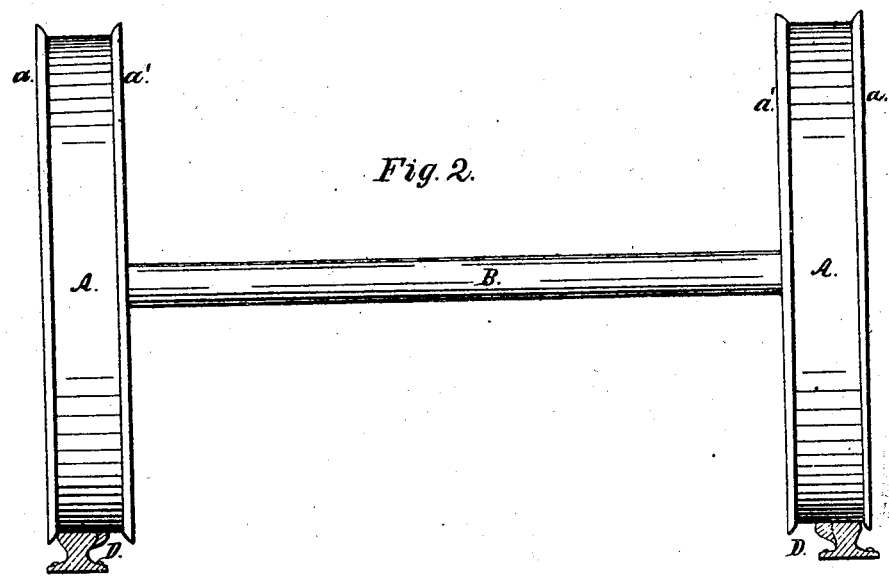

In the said drawings, which are hereunto annexed, Figure 1 represents a side view of my improved car-wheel standing upon a railroad-track of the four feet and eight and a half inch gage, and Fig. 2 represents a similar view thereof when standing upon a track of the four feet and ten inch gage.

The nature of my invention consists in providing the wheel of a railroad car or locomotive with two flanges—one on the inside of the wheel, as car-wheels are usually constructed, and an additional flange on the outside of said wheel.

It further consists in increasing the width of the wheel, so that the face of the wheel included between the two flanges aforesaid shall be of such width as to exceed the width of the face of the rail by a little more than three-fourths of one inch.

The object of my invention is to obtain a wheel for locomotives and railroad-cars which will run upon both the narrow or four feet eight inch and a half gage and the four feet ten inch gage with equal facility.

To enable those skilled in the art to understand how to construct and use my invention, I will proceed to describe the same with particularity.

A A represent a pair of wheels of my invention standing upon a railroad-track—in Fig. 1 upon a track of the four feet eight and a half inch gage, and in Fig. 2 upon the four feet ten inch gage.

The axle B, which connects each pair of wheels, is of such length as to cause the inner flanges upon each wheel (marked *a'* in the drawings,) to run close against the inner side of the rails of the four feet eight and a half inch gage track, and the faces of the wheels included between the flanges *a' a* are made of sufficient width so that the outside of the rails of a four feet ten inch gage track will run close against the outer flanges upon the wheels marked *a*.

As the difference in the width of the two gages is only one and a half inches, it is only required to have the width of the face of each wheel exceed the width of the face of the rail by three-fourths of an inch.

C C in Fig. 1 and D D in Fig. 2 represent cross-sections of the rails forming the tracks upon which the wheels are designed to run, Fig. 1 showing the relative position of the wheels and a track of the four feet eight and a half inch gage, and Fig. 2 showing the relative position of said wheels and a track of the four feet ten inch gage.

I am aware that car-wheels have heretofore been constructed with two flanges for the purpose of affording additional safety and security against running off the track by fastening upon the wheel a separate piece of metal, as a flange, by bolts or screws, but my improvement consists in constructing a double-flanged car-wheel of a single casting, the additional flange being cast upon and forming part of said wheel, by the employment of a chill of peculiar construction for that purpose contrived, for which I have also made application for Letters Patent; but the purpose of my invention not being additional safety or security, but to adapt a car-wheel alike to rail-tracks of the two different gages, as aforesaid, cannot be effected simply by providing the wheel with two flanges, as described, but another important alteration in the wheel must necessarily be made before the purpose of my invention can be attained—namely, the placing of the said additional flange of the wheel at such a distance from the inner flange thereof that the face or tread of the wheel included between said flanges shall be of such breadth that while the inner flanges shall run close against the inner sides of the rails of a four feet eight and a half inch gage track, the outer flanges shall run close against the outer sides of the rails of a four feet ten inch gage track—both the additional flange and the increased breadth of tread being essential to the accomplishment of my purpose, and both being substantial alterations and changes in the construction of car-wheels.

What I claim, therefore, as new and desire to secure by Letters Patent, is—

Constructing a two-flanged car-wheel of a single casting when the outside flange is placed at such a distance from the inside flange that the wheel is adapted to the two different gages hereinbefore described, substantially as herein specified and set forth.

THOMAS SHARP.

Witnesses:
W. E. MARRS,
B. W. SQUIRES.